United States Patent
McGuinness

(10) Patent No.: US 11,574,002 B1
(45) Date of Patent: Feb. 7, 2023

(54) IMAGE TRACING SYSTEM AND METHOD

(71) Applicant: Mindtech Global Limited, Sheffield (GB)

(72) Inventor: Peter McGuinness, Albuquerque, NM (US)

(73) Assignee: Mindtech Global Limited, Sheffield (GB)

(*) Notice: Subject to any disclaimer, the term of this patent is extended or adjusted under 35 U.S.C. 154(b) by 0 days.

(21) Appl. No.: 17/712,791

(22) Filed: Apr. 4, 2022

(51) Int. Cl.
*G06F 16/51* (2019.01)
*G06T 11/00* (2006.01)
*G06T 17/00* (2006.01)

(52) U.S. Cl.
CPC .............. *G06F 16/51* (2019.01); *G06T 11/00* (2013.01); *G06T 17/00* (2013.01)

(58) Field of Classification Search
CPC ................................ G06F 16/51; G06T 11/00
See application file for complete search history.

(56) References Cited

U.S. PATENT DOCUMENTS

| | | | | |
|---|---|---|---|---|
| 2007/0103565 A1* | 5/2007 | Xu | .......................... | G06V 20/10 |
| | | | | 707/E17.026 |
| 2021/0149915 A1* | 5/2021 | Lee | ........................ | G06F 16/273 |
| 2021/0166477 A1* | 6/2021 | Bunkasem | ............ | G06K 9/6262 |
| 2022/0198737 A1* | 6/2022 | Enthed | ................... | G06T 15/205 |

\* cited by examiner

*Primary Examiner* — Yi Yang
(74) *Attorney, Agent, or Firm* — Fresh IP PLC; John R. Bednarz

(57) ABSTRACT

A method includes tagging, by at least one processor, one or more three-dimensional assets with a unique identifier and storing the one or more three-dimensional assets in a database, creating, by the at least one processor, a three-dimensional model based on the one or more three-dimensional assets and loading the three-dimensional model in a simulator, generating, by the at least one processor, a two-dimensional image that is a representation of the three-dimensional model in the simulator, the two-dimensional image comprising metadata that includes each unique identifier for each three-dimensional asset of the three-dimensional model displayed in the two-dimensional image, and assigning, by the at least one processor, the two-dimensional image with a unique identifier and storing each unique identifier for each three-dimensional asset of the three-dimensional model displayed in the two-dimensional image in metadata for the two-dimensional image.

12 Claims, 6 Drawing Sheets

IMAGE TRACING SYSTEM AND METHOD

BACKGROUND

Neural networks may utilize a large amount of data to train. Privacy and ownership may mandate that any data used in the training be verifiably owned or correctly licensed by the user of the network. In addition, any real world data is to be used with permission. The process of assembling training datasets is complex and ill-structured. Data may be from many different sources and may undergo many changes before being used in a given training. In order to satisfy requirements, there should be a chain linking the data used in the training back to the source data. While it is possible to maintain traceability within a closed system, network training can result in data being detached from the system. There should be a way of tracing data that is embedded in the data itself. Additionally, synthetic data presents additional problems. Simulated environments can make use of source materials and assets that exist separately from synthetic images but ownership of and rights to the assets should be provable.

It is with these issues in mind, among others, that various aspects of the disclosure were conceived.

SUMMARY

The present disclosure is directed to an image tracing system and method. A system may include an asset manager that receives input assets, each of which can have a global unique identifier. The asset manager may be used to insert the assets into a simulator to simulate a three-dimensional simulation of a scene. As an example, assets such as people, cars, items, etc. may be inserted into the scene. A series of events may be added as well as cameras may be inserted into the scene. Global variables may be set for the scene and the simulator may run a simulation and capture or film the events. Images from the events may be output and a curation manager may be used to expand or optimize the images. The images may be used to train a network. Each image may have the globally unique identifier and also may have metadata that represents a globally unique identifier for each asset in the image.

In one example, a system may include a memory storing computer-readable instructions and at least one processor to execute the instructions to tag one or more three-dimensional assets with a unique identifier and store the one or more three-dimensional assets in a database, create a three-dimensional model based on the one or more three-dimensional assets and load the three-dimensional model in a simulator, generate a two-dimensional image that is a representation of the three-dimensional model in the simulator, the two-dimensional image comprising metadata that includes each unique identifier for each three-dimensional asset of the three-dimensional model displayed in the two-dimensional image, and assign the two-dimensional image with a unique identifier and store each unique identifier for each three-dimensional asset of the three-dimensional model displayed in the two-dimensional image in metadata for the two-dimensional image.

In another example, a method may include tagging, by at least one processor, one or more three-dimensional assets with a unique identifier and storing the one or more three-dimensional assets in a database, creating, by the at least one processor, a three-dimensional model based on the one or more three-dimensional assets and loading the three-dimensional model in a simulator, generating, by the at least one processor, a two-dimensional image that is a representation of the three-dimensional model in the simulator, the two-dimensional image comprising metadata that includes each unique identifier for each three-dimensional asset of the three-dimensional model displayed in the two-dimensional image, and assigning, by the at least one processor, the two-dimensional image with a unique identifier and storing each unique identifier for each three-dimensional asset of the three-dimensional model displayed in the two-dimensional image in metadata for the two-dimensional image.

In another example, a non-transitory computer-readable storage medium includes instructions stored thereon that, when executed by a computing device cause the computing device to perform operations, the operations including tagging one or more three-dimensional assets with a unique identifier and storing the one or more three-dimensional assets in a database, creating a three-dimensional model based on the one or more three-dimensional assets and loading the three-dimensional model in a simulator, generating a two-dimensional image that is a representation of the three-dimensional model in the simulator, the two-dimensional image comprising metadata that includes each unique identifier for each three-dimensional asset of the three-dimensional model displayed in the two-dimensional image, and assigning the two-dimensional image with a unique identifier and storing each unique identifier for each three-dimensional asset of the three-dimensional model displayed in the two-dimensional image in metadata for the two-dimensional image.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
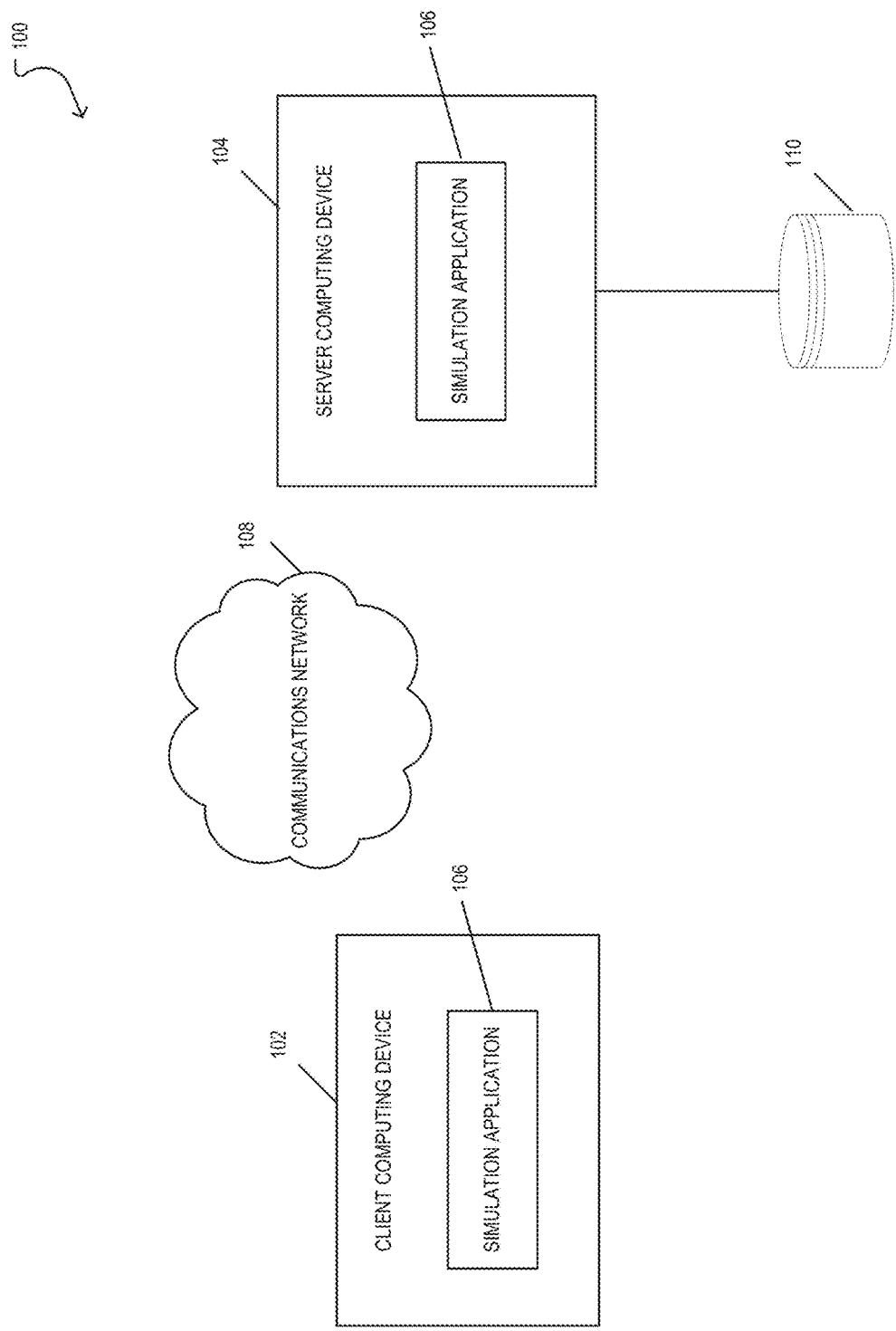
FIG. 1 is a block diagram of an image tracing system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of an image tracing system may include a memory storing computer-readable instructions and at least one processor to execute the instructions to tag one or more three-dimensional assets with a unique identifier and store the one or more three-dimensional assets in a database, create a three-dimensional model based on the one or more three-dimensional assets and load the three-dimensional model in a simulator, generate a two-dimensional image that is a representation of the three-dimensional model in the simulator, the two-dimensional image comprising metadata that includes each unique identifier for each three-dimensional asset of the three-dimensional model displayed in the two-dimensional image, and assign the two-dimensional image with a unique identifier and store each unique identifier for each three-dimensional asset of the three-dimensional model displayed in the two-dimensional image in metadata for the two-dimensional image.

In one example, the two-dimensional image is an original two-dimensional image, and the at least one processor may further execute the instructions to generate one or more new two-dimensional images based on the original two-dimensional image by transforming the original two-dimensional image and store the unique identifier for the original two-dimensional image in metadata for each of the one or more new two-dimensional images.

The image tracing system may establish provenance of assets to be used in a three-dimensional simulation. As an example, the assets used in the generation of an image created by a three-dimensional modeling program may be traced. In another example, history of transforms and modifications to images may be preserved in such a way that an original image can be traced. In another example, details of reversable transforms performed on images may be preserved in such a way that the original image can be recreated.

The image tracing system may utilize synthesized image data and embed enough data or metadata within each image such that each image may be identified. Each image may be identified through transformation, curation, synthesis, and modeling such that each image can be traced back to a specific simulation event. For the simulation event, each image used for each asset in the simulation event can be uniquely identified.

Three-dimensional models that may be used in a simulation may include meshes and materials that may include image textures that are assembled into scenes such as a digital twin world. The scenes may depict the world to be synthesized. In addition, the models also may be assembled into packs of elements that can be reused to create scenarios that can be synthesized. Many scenarios can be synthesized by combining digital twin scenes and using training data packs. This may result in sets of images and other metadata that can be used to form training datasets. One type of metadata may include annotation data, which may include a record of each image produced and of every asset of interest used in a training process for a specific image. Another type of metadata may include a scenario data file that may include a record of each asset available to the simulation in a form that can be traced back to an original asset. In addition, the metadata in each image may include a custom field that is added to Exif data for the image. The metadata may include enough data to link the image back to the simulation event that produced the image even if the image is somehow detached from a dataset.

During a data curation phase, datasets may be combined with data from other simulation events and may be transformed in various reversible and non-reversible ways. Datasets that may be produced may be regarded as new datasets, but still are to be linked back to an original simulation event. As an example, for each recombination or transformation, there may be links preserved in metadata back to an original simulation event. Thus, the metadata may be preserved and augmented with new metadata to store membership of the new dataset and transforms or combinations of transforms that may be used to produce the new image. As a result, each image can be traced back to an original simulation event and to original source assets used in the production. Additionally, if real world data is combined with synthetic data in a training of a neural network, it is possible to embed ownership and permission data in each image to maintain traceability for all data used in the training.

The system may make use of Exif data associated with image files that can be used to establish ownership of real images captured with a camera. The system may utilize Exif data to establish ownership of individual elements that may make up a still two-dimensional image that is generated from a three-dimensional simulation. Ownership may be established by using embedded metadata to record transforms performed on an image while continuing to preserve a link back to an original image.

Each asset to be used in synthesis can be assigned or provided with a globally unique identifier (GUID) when the asset is acquired. The assets may be stored in one or more databases along with a respective GUID that may be embedded in asset properties before the asset is assembled into a digital twin or training data pack. As a result, license and permission data may be stored along with the asset and can be obtained from the database using the GUID as a key. When images are generated by the system, they are assigned a GUID that can be based on information related to a simulation event and the GUID may be embedded in a custom Exif field with the image.

Artificial intelligence (AI) systems can learn to "see" by analyzing huge quantities of annotated images. However, the responsibility is on companies and their machine learning engineers to obtain relevant data and have permission to use that data. It is known that up to 80% of data scientists and machine learning engineers' time can be spent finding, cleaning, and organizing data. In one example, researchers curated 45 terabytes of data to extract 570 gigabytes of training data. More than half of the cycle can include gathering, ingesting, and labeling data. This is because identifying and finding real world data is very challenging.

The key elements for an AI system may include data for training, validation, and testing as well as the deployment data to produce results. In addition, the AI system may include a network and/or algorithm such as RESNET along with one or more frameworks that may be used such as PyTorch, Keras, and TensorFlow, among others. The AI system may include hardware and computing devices for training and hardware and computing devices for deployment including processing and data capture.

There are many data gathering issues and requirements that present major challenges to address and overcome. As an example, the issues can include extremely large datasets, privacy and General Data Protection Regulation (GDPR) issues, the inability to provide accurate and advanced annotations, data has to match deployment systems, data provenance issues, inappropriate data and data that is not up to date, corner case data issues, environmental conditions, camera angle issues, and bias and diversity issues in data.

The system discussed herein includes an artificial intelligence training platform that can rapidly generate high quality fully annotated synthetic training images. This system can accelerate training and can solve training data challenges that can free machine learning engineers to focus on network development.

The system can build a virtual world using photo-realistic three-dimensional models. Assets such as people, cars, and items can be inserted. Series of events can be defined and cameras can be placed in the virtual world. Global variables can be set such as weather and time of day, among others. Next, a simulator of the virtual world can be run to film or capture events in the virtual world. Two-dimensional images of the virtual world can be output including pixel perfect annotations, masks, and metadata. A curation manager can be used to manage a database of the images as well as expand and optimize the number of images. The images generated by the system can be used to train a neural network.

One way to train a neural network is by having high-quality data and a large quantity of data that includes a vast amount of synthetic data. The synthetic data can be used to avoid privacy and permission issues as well as prevent bias and appropriate diversity in the data.

A proportion of real versus synthetic data may depend on the application. For a typical use case, synthetic data may reduce real data requirements by around 90%. Synthetic data can provide "real world" closeness, can have exact annotation accuracy, the annotation speed may be instantaneous and computational cost may be near none. In addition, there may be no privacy concerns and the ability to model and re-target capture environment may be done through a simulating inference system. The synthetic data can be used to actively reduce bias. Further, the synthetic data can be used to accurately model environmental conditions that are rare events.

FIG. 1 is a block diagram of an image tracing system 100 according to an example of the instant disclosure. As shown in FIG. 1, the system 100 may include at least one client computing device 102 as well as at least one server computing device 104. The client computing device 102 and the server computing device 104 may have a simulation application 106. As an example, there may be a server-side component of the simulation application 106 as well as a client-side component of the simulation application 106. The at least one server computing device 104 may be in communication with at least one database 110.

The client computing device 102 and the server computing device 104 may have the simulation application 106 that may be a component of an application and/or service executable by the at least one client computing device 102 and/or the server computing device 104. For example, the simulation application 106 may be a single unit of deployable executable code or a plurality of units of deployable executable code. According to one aspect, the simulation application 106 may include one or more components that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The image tracing system 100 also may include a relational database management system (RDBMS) or another type of database management system such as a NoSQL database system that stores and communicates data from at least one database 110. The data stored in the at least one database 110 may be associated with one or more users associated with the system, assets associated with the system 100, images associated with the system, asset packs, training data packs associated with the system, as well as simulation files associated with the system created by each of the one or more users. Each user may have username/password information for use with the system.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

Figure 2:
FIG. 2 shows two images generated by a simulation program of the image tracing system according to an example of the instant disclosure.

FIG. 2 is a diagram of two two-dimensional images 202 and 204 that are a representation of a three-dimensional model generated by the simulation application 106. The images 202 and 204 are scenes from the virtual world. As shown in FIG. 2, a first scene in the first two-dimensional image 202 shows an interior of an office generated by the simulation application 106. A second scene in the second two-dimensional image 204 shows an exterior of a building, such as a hospital or an office building generated by the simulation application 106.

Figure 3:
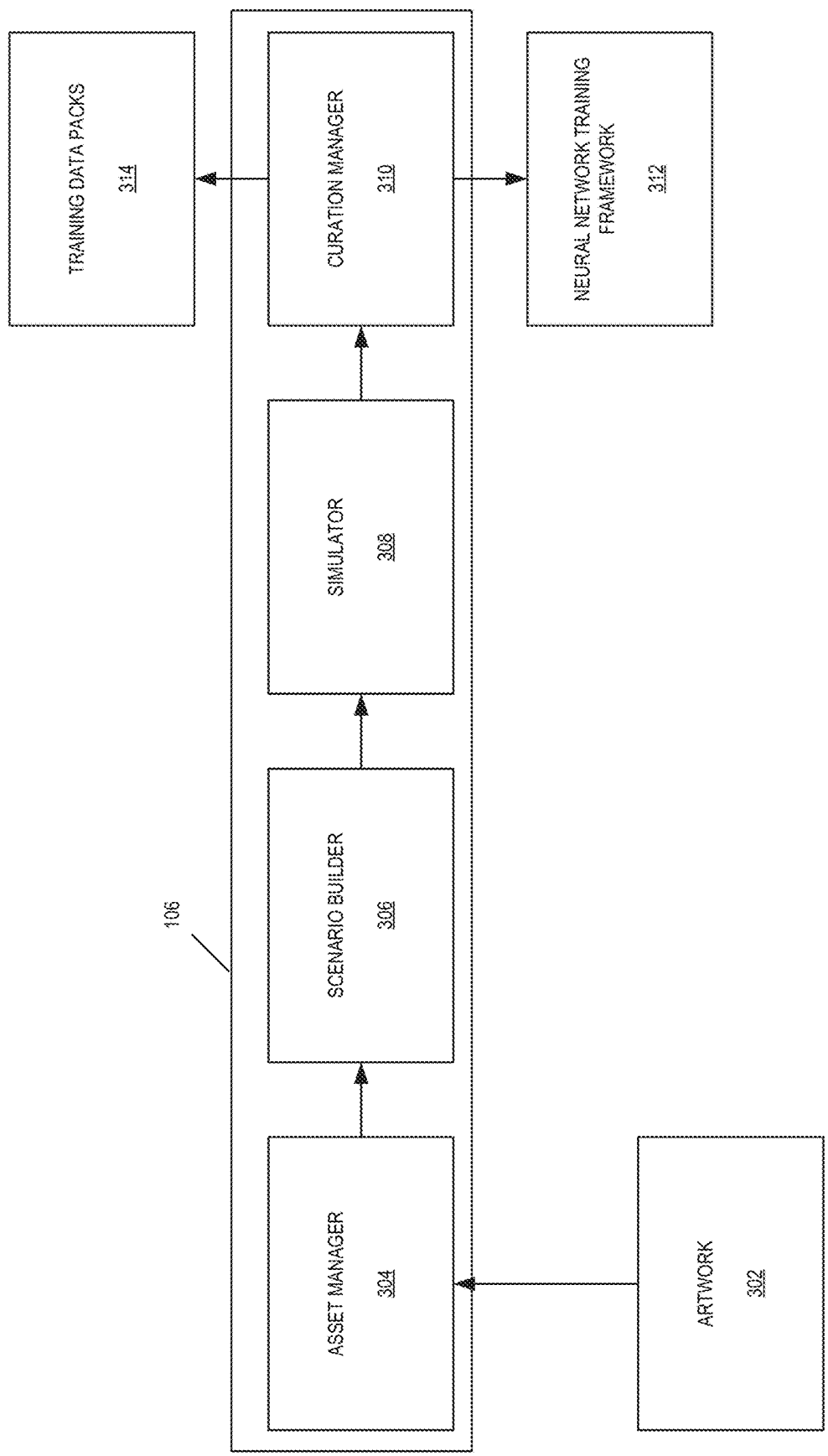
FIG. 3 is a block diagram of the simulation program according to an example of the instant disclosure.

FIG. 3 is a block diagram of the simulation application 106 according to an example of the instant disclosure. The simulation application 106 may be executed by the server computing device 104. The server computing device 104 includes computer readable media (CRM) in memory on which the simulation application 106 is stored. The computer readable media may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The simulation application 106 may include an asset manager 304 according to an example of the instant disclosure. As shown in FIG. 3, the asset manager 304 may receive artwork 302 such as three-dimensional artwork models from a plurality of sources. The asset manager 304 may import the artwork 302 including graphical assets and convert the graphical assets into smart objects for use by the simulation application 106.

The asset manager 304 may import and convert the three-dimensional artwork models as well as consistently and accurately tag the three-dimensional artwork assets. An asset warehouse tool of the asset manager 304 may be used to ensure items are labeled (e.g., categorized, subcategorized, tagged). The asset warehouse tool may have a web-based interface and may utilize the database 110. The asset warehouse tool may be used to ensure comprehensive and consistent labeling. The asset manager 304 may be based on UNITY and may allow import of Filmbox (FBX) artwork to convert to simulation application 106 smart assets. Each smart asset may have metadata and may be tagged using a JSON string that includes one or more fields.

The simulation application 106 may include a scenario builder 306 according to an example of the instant disclosure. The scenario builder 306 may rapidly create scenarios and may set simulation conditions. The scenario builder 306 may be a graphical user interface (GUI) tool that also may include a search interface that allows a user to find assets and manage the assets to be inserted into a scenario. This search interface may allow a user to locate assets to provide and ensure diversity. The scenario builder 306 may have a full visual three-dimensional user interface that may allow quick and precise scenario creation. It allows advance autopopulating and creates unlimited possibilities with data. The scenario builder 306 may include a scenario editor that may allow the user to build a story by placing one or more assets into a scene, assigning activities to the one or more assets, allowing complex route planning with deterministic random sequences to be generated, and allow automatic population for rapid creation of massively carried datasets.

The simulation application 106 may include a simulator 308 according to an example of the instant disclosure. The simulator 308 may run simulations and create images as well as annotations. The simulator 308 may use the scenarios created by the scenario builder 306 to create large, fully annotated datasets that may be used to train artificial intelligence (AI) systems. The simulator 308 may create a dataset that may allow behavior modeling, attractors and generators, animations, and scriptability. The simulator 308 may be fully scriptable and can be run using a graphical user interface (GUI) or using a command line interface. Attractors can be used to create events and influence behaviors.

The simulation application 106 may include a curation manager 310 according to an example of the instant disclosure. The curation manager 310 may analyze and augment the data in the datasets such as the images for bias and diversity. The curation manager may provide new models for creation as well as update requirements for scenarios and simulations. In addition, the curation manager 310 may provide output to the neural network training framework 312 to train the network. The curation manager 310 also may generate one or more training data packs 314 that may comprise images that are ready-to-go datasets. The curation manager 310 may allow a machine learning engineer to analyze created datasets. The user can perform searches to allow a precise creation of a dataset. The curation manager 310 includes data augmentation tools that may allow for further refinement of the dataset. In addition, the curation manager 310 may allow the user to fully understand the dataset and distribution of data in the dataset to ensure desired diversity and help detect potential bias.

The curation manager 310 may analyze and visualize dataset contents. Results may be exported as a new dataset or may reference existing data. Other tools may be related to data augmentation such as domain matching and style transfer. The curation manager 310 may allow the machine learning engineer to analyze created datasets. Searches that may be complex may be used to create a precise creation of a dataset. Data augmentation tools may allow for further refinement of the dataset. The full understanding of the dataset distribution may allow and ensure desired diversity and may help detect potential bias. Results may be exported as a new dataset or may reference existing data.

Figure 4:
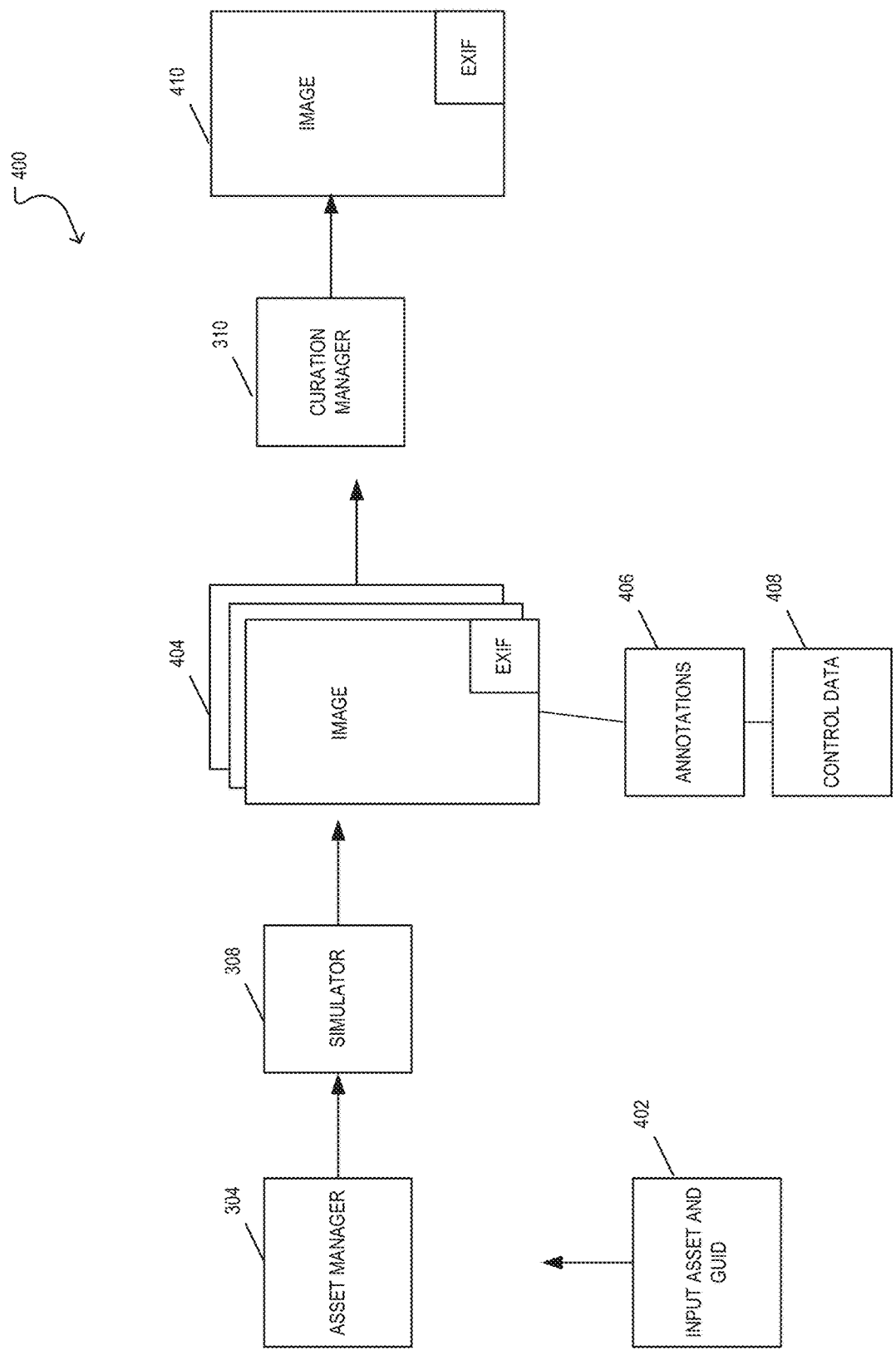
FIG. 4 is a flowchart showing image tracing by the image tracing system according to an example of the instant disclosure.

FIG. 4 is a flowchart 400 showing image tracing by the image tracing system according to an example of the instant disclosure. As shown in FIG. 4, an input asset and its respective GUID 402 can be provided to the asset manager 304 of the simulation application 106. Every asset is provided a GUID when it is added to the database 110, e.g., 12345 or ABCDE. GUIDs may be transferred to the simulator and images that are created. Each simulation is provided with a GUID and each image is also provided with a GUID.

Next, the asset manager provides the asset and the GUID 402 to the simulator 308 of the simulation application 106. The simulator 308 creates one or more images 404 each of which have Exif data that refer to annotations 406 with one or more GUIDs as well as control data 408 that includes one or more GUIDs. The annotations 406 may include labeled bounding boxes, three-dimensional bounding boxes, semantic segmentation, instance semantic segmentation, depth information, skeleton key points and DLIB 68 support, surface normal information, and velocity information, among others. The simulator 308 provides the one or more images 404 to the curation manager 310.

The curation manager may generate an image 410 that includes metadata. As an example, the image 410 may be a Portable Network Graphics (PNG) file that includes standard PNG metadata fields including keywords including Title (e.g., Project name), Author (e.g., Chameleon), Description (e.g., type of information contained such as visible image), Copyright (e.g., Copyright Year Mindtech Global, All rights reserved. Creation Time (e.g., Time of original image creation), Software (e.g., Simulator or Toolkit as appropriate), Disclaimer, Warning, Source (e.g., version of simulator), and Comment (e.g., N/A).

An additional custom ancillary metadata field associated with the system 100 is included that may comprise a JSON string including traceability data with the following fields: ID, pass_number, initial_sim_time, sim_event, modified, source_immediate, source_ultimate, transform, and tool_parameters. The ancillary metadata file may be a PNG metadata file and may be stored after a particular keyword, e.g., Mindtech.

TABLE ONE

| JSON string containing traceability data | | |
|---|---|---|
| Field | Type | notes |
| id | string | The GUID of this image |
| pass_number | int | The number id of the current simulation pass in this sequence |
| initial_sim_time | string | The time of day in HH:MM:SS:ms format of the start of the sequence this image belongs to (this is the value of sim_start_time for this pass) |
| sim_event | string | The GUID of the sim event used to generate this image |
| modified | bool | True if this image has been modified by post-processing in the AI toolkit after it was generated by the simulator |
| source_immediate | string | If modified = true, the GUID of the source file this image was created from. |
| source_ultimate | string | the GUID of the source file created by the sim event referenced by sim_event |
| transform | List<string> | The AI toolkit tool(s) used to modify the image (or a list of tools, in the order they were used) |
| tool_parameters | List<string> | The parameters of the tool(s) used. The format of the strings is not defined here, it may be interpreted by the tools and hence may differ between tools |

Figure 5:
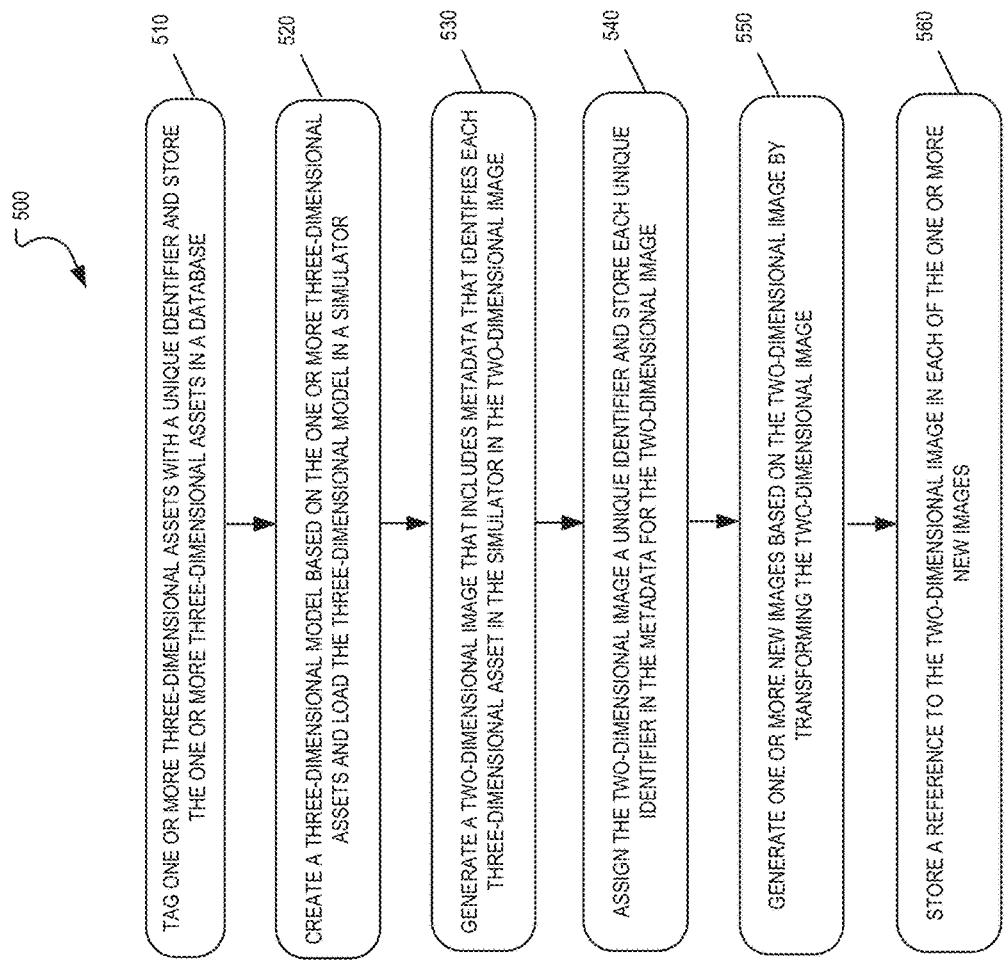
FIG. 5 is a flowchart of a method of tracing one or more images used in a simulation according to an example of the instant disclosure.

FIG. 5 illustrates an example method 500 of tracing one or more images used in a simulation according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 may include tagging one or more three-dimensional assets with a unique identifier and storing the one or more three-dimensional assets in the database 110 at block 510. The unique identifier may be a global unique identifier or GUID. The method 500 may further include embedding each global unique identifier in a custom metadata field.

In one example, the custom metadata field is an exchangeable image file format (Exif) field. In another example, the custom metadata field may be a Javascript Object Notation (JSON) string. As an example, the JSON string may include an id field for the unique identifier, a pass_number field, an initial_sim_time field, a sim_event field, a modified field, a source_immediate field, a source_ultimate field, a transform field, and a tool_parameters field.

Next, according to some examples, the method 500 may include creating a three-dimensional model based on the one or more three-dimensional assets and loading the three-dimensional model in the simulator 308 at block 520.

Next, according to some examples, the method 500 may include generating a two-dimensional image that includes metadata that identifies each three-dimensional asset in the simulator 308 in the two-dimensional image at block 530.

Next, according to some examples, the method 500 may include assigning the two-dimensional image a unique identifier and storing each unique identifier in the metadata for the two-dimensional image at block 540.

Next, according to some examples, the method 500 may include generating one or more new images based on the two-dimensional image by transforming the two-dimensional image at block 550. The one or more new images may be a first set of two-dimensional images. After the one or more new images are created, it is possible to repeat and generate further new images to create a second set of new images derived from them and store one or more new images and the second set of new images. This step is repeatable to continue to generate a new set of images based on previous set of new images.

As an example, the method 500 may include generating a second set of two-dimensional images based on the first set of two-dimensional images by transforming the first set of two-dimensional images.

Next, according to some examples, the method 500 may include storing a reference to the two-dimensional image in each of the one or more new images at block 560.

In some examples, the method 500 may include storing the original two-dimensional image and the one or more new two-dimensional images in a training data pack in the database.

Figure 6:
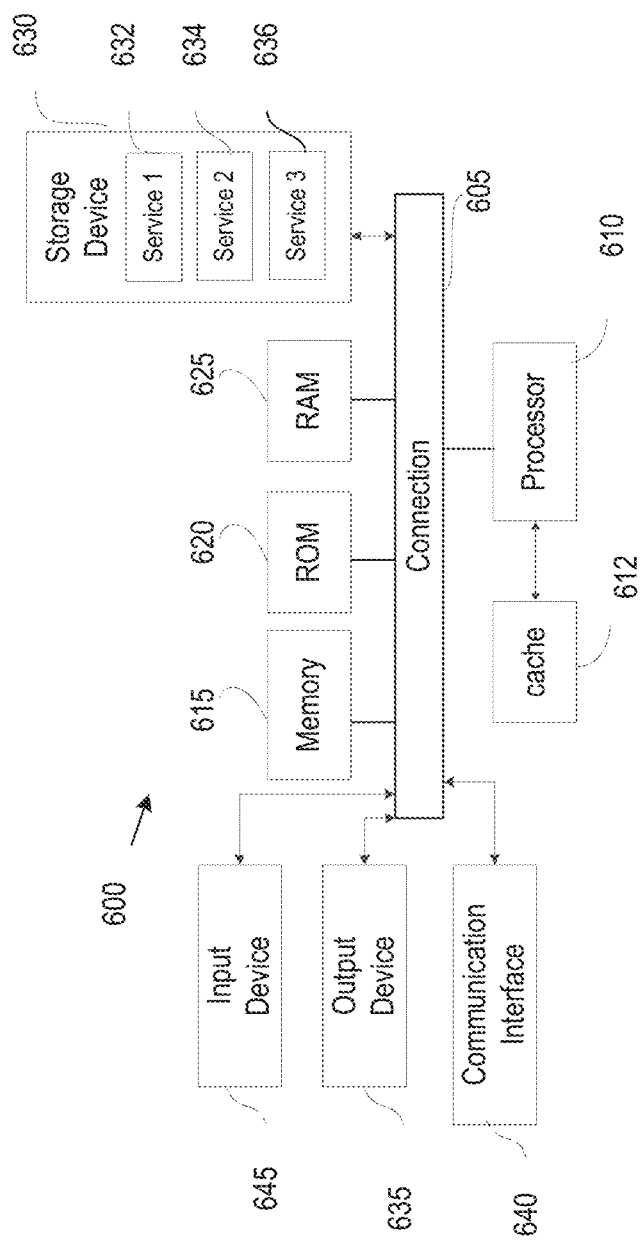
FIG. 6 shows an example of a system for implementing certain aspects of the present technology.

FIG. 6 shows an example of computing system 600, which can be for example any computing device making up the computing device such as the client computing device 102, the server computing device 104, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: tagging, by at least one processor, one or more three-dimensional assets with a unique identifier and storing the one or more three-dimensional assets in a database, creating, by the at least one processor, a three-dimensional model based on the one or more three-dimensional assets and loading the three-dimensional model in a simulator, generating, by the at least one processor, a two-dimensional image that is a representation of the three-dimensional model in the simulator, the two-dimensional image comprising metadata that includes each unique identifier for each three-dimensional asset of the three-dimensional model displayed in the two-dimensional image, and assigning, by the at least one processor, the two-dimensional image with a unique identifier and storing each unique identifier for each three-dimensional asset of the three-dimensional model displayed in the two-dimensional image in metadata for the two-dimensional image.

Aspect 2: The method of Aspect 1, wherein the two-dimensional image is an original two-dimensional image, the method further comprising generating one or more new two-dimensional images based on the original two-dimensional image by transforming the original two-dimensional image and storing the unique identifier for the original two-dimensional image in metadata for each of the one or more new two-dimensional images.

Aspect 3: The method of Aspects 1 and 2, further comprising storing the original two-dimensional image and the one or more new two-dimensional images in a training data pack in the database.

Aspect 4: The method of Aspects 1 to 3, wherein the one or more new two-dimensional images comprise a first set of two-dimensional images, the method further comprising: generating a second set of two-dimensional images based on the first set of two-dimensional images by transforming the first set of two-dimensional images and storing the unique identifier for the original two-dimensional image in metadata for each image in the second set of two-dimensional images.

Aspect 5: The method of Aspects 1 to 4, wherein each unique identifier is a global unique identifier.

Aspect 6: The method of Aspects 1 to 5, further comprising embedding each global unique identifier in a custom metadata field.

Aspect 7: The method of Aspects 1 to 6, wherein the custom metadata field is an exchangeable image file format (Exif) field.

Aspect 8: The method of Aspects 1 to 7, wherein the custom metadata field comprises a Javascript Object Notation (JSON) string.

Aspect 9: The method of Aspects 1 to 8, wherein the JSON string comprises an id field for the unique identifier, a pass_number field, an initial_sim_time field, a sim_event field, a modified field, a source_immediate field, a source_ultimate field, a transform field, and a tool_parameters field.

Aspect 10: A system comprising a memory storing computer-readable instructions and at least one processor to execute the instructions to tag one or more three-dimensional assets with a unique identifier and store the one or more three-dimensional assets in a database, create a three-dimensional model based on the one or more three-dimensional assets and load the three-dimensional model in a simulator, generate a two-dimensional image that is a representation of the three-dimensional model in the simulator, the two-dimensional image comprising metadata that includes each unique identifier for each three-dimensional asset of the three-dimensional model displayed in the two-dimensional image, and assign the two-dimensional image with a unique identifier and store each unique identifier for each three-dimensional asset of the three-dimensional model displayed in the two-dimensional image in metadata for the two-dimensional image.

Aspect 11: The system of Aspect 10, wherein the two-dimensional image is an original two-dimensional image, the at least one processor further to execute the instructions to generate one or more new two-dimensional images based on the original two-dimensional image by transforming the original two-dimensional image and store the unique identifier for the original two-dimensional image in metadata for each of the one or more new two-dimensional images.

Aspect 12: The system of Aspects 10 and 11, the at least one processor further to execute the instructions to store the original two-dimensional image and the one or more new two-dimensional images in a training data pack in the database.

Aspect 13: The system of Aspects 10 to 12, wherein the one or more new two-dimensional images comprise a first set of two-dimensional images, the at least one processor further to execute the instructions to generate a second set of two-dimensional images based on the first set of two-dimensional images by transforming the first set of two-dimensional images and store the unique identifier for the original two-dimensional image in metadata for each image in the second set of two-dimensional images.

Aspect 14: The system of Aspects 10 to 13, wherein each unique identifier is a global unique identifier.

Aspect 15: The system of Aspects 10 to 14, the at least one processor further to execute the instructions to embed each global unique identifier in a custom metadata field.

Aspect 16: The system of Aspects 10 to 15, wherein the custom metadata field is an exchangeable image file format (Exif) field.

Aspect 17: The system of Aspects 10 to 16, wherein the custom metadata field comprises a Javascript Object Notation (JSON) string.

Aspect 18: The system of Aspects 10 to 17, wherein the JSON string comprises an id field for the unique identifier, a pass_number field, an initial_sim_time field, a sim_event field, a modified field, a source_immediate field, a source_ultimate field, a transform field, and a tool_parameters field.

Aspect 19: A non-transitory computer-readable storage medium comprising instructions stored thereon that, when executed by a computing device cause the computing device to perform operations, the operations comprising tagging one or more three-dimensional assets with a unique identifier and storing the one or more three-dimensional assets in a database, creating a three-dimensional model based on the one or more three-dimensional assets and loading the three-dimensional model in a simulator, generating a two-dimensional image that is a representation of the three-dimensional model in the simulator, the two-dimensional image comprising metadata that includes each unique identifier for each three-dimensional asset of the three-dimensional model displayed in the two-dimensional image, and assigning the two-dimensional image with a unique identifier and storing each unique identifier for each three-dimensional asset of the three-dimensional model displayed in the two-dimensional image in metadata for the two-dimensional image.

Aspect 20: The non-transitory computer-readable storage medium of Aspect 19, wherein the two-dimensional image is an original two-dimensional image, the operations further comprising generating one or more new two-dimensional images based on the original two-dimensional image by transforming the original two-dimensional image and storing the unique identifier for the original two-dimensional image in metadata for each of the one or more new two-dimensional images.

Aspect 21: The non-transitory computer-readable storage medium of Aspects 19 and 20, the operations further comprising storing the original two-dimensional image and the one or more new two-dimensional images in a training data pack in the database.

Aspect 22: The non-transitory computer-readable storage medium of Aspects 19 to 21, wherein the one or more new two-dimensional images comprise a first set of two-dimensional images, the operations further comprising generating a second set of two-dimensional images based on the first set of two-dimensional images by transforming the first set of two-dimensional images and storing the unique identifier for the original two-dimensional image in metadata for each image in the second set of two-dimensional images.

Aspect 23: The non-transitory computer-readable storage medium of Aspects 19 to 22, wherein each unique identifier is a global unique identifier.

Aspect 24: The non-transitory computer-readable storage medium of Aspects 19 to 23, the operations further comprising embedding each global unique identifier in a custom metadata field.

Aspect 25: The non-transitory computer-readable storage medium of Aspects 19 to 24, wherein the custom metadata field is an exchangeable image file format (Exif) field.

Aspect 26: The non-transitory computer-readable storage medium of Aspects 19 to 25, wherein the custom metadata field comprises a Javascript Object Notation (JSON) string.

Aspect 27: The non-transitory computer-readable storage medium of Aspects 19 to 26, wherein the JSON string comprises an id field for the unique identifier, a pass_number field, an initial_sim_time field, a sim_event field, a modified field, a source_immediate field, a source_ultimate field, a transform field, and a tool_parameters field.

What is claimed is:
1. A method, comprising:
tagging, by at least one processor, one or more three-dimensional assets with a global unique identifier, embedding each global unique identifier in a custom metadata field, and storing the one or more three-dimensional assets in a database;
creating, by the at least one processor, a three-dimensional model based on the one or more three-dimensional assets and loading the three-dimensional model in a simulator;
generating, by the at least one processor, a two-dimensional image that is a representation of the three-dimensional model in the simulator, the two-dimensional image comprising metadata that includes each global unique identifier for each three-dimensional asset of the three-dimensional model displayed in the two-dimensional image; and
assigning, by the at least one processor, the two-dimensional image with a global unique identifier and storing each global unique identifier for each three-dimensional asset of the three-dimensional model displayed in the two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field for the two-dimensional image.

2. The method of claim 1, wherein the two-dimensional image is an original two-dimensional image, the method further comprising:
generating one or more new two-dimensional images based on the original two-dimensional image by transforming the original two-dimensional image; and
storing the global unique identifier for the original two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field, for each of the one or more new two-dimensional images.

3. The method of claim 2, further comprising storing the original two-dimensional image and the one or more new two-dimensional images in a training data pack in the database.

4. The method of claim 2, wherein the one or more new two-dimensional images comprise a first set of two-dimensional images, the method further comprising:
generating a second set of two-dimensional images based on the first set of two-dimensional images by transforming the first set of two-dimensional images; and
storing the global unique identifier for the original two-dimensional image in metadata for each image in the second set of two-dimensional images.

5. A system comprising:
a memory storing computer-readable instructions; and
at least one processor to execute the instructions to:
tag one or more three-dimensional assets with a global unique identifier, embed each global unique identifier in a custom metadata field, and store the one or more three-dimensional assets in a database;
create a three-dimensional model based on the one or more three-dimensional assets and load the three-dimensional model in a simulator;
generate a two-dimensional image that is a representation of the three-dimensional model in the simulator, the two-dimensional image comprising metadata that includes each global unique identifier for each three-dimensional asset of the three-dimensional model displayed in the two-dimensional image; and
assign the two-dimensional image with a global unique identifier and store each global unique identifier for each three-dimensional asset of the three-dimensional model displayed in the two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field for the two-dimensional image.

6. The system of claim 5, wherein the two-dimensional image is an original two-dimensional image, the at least one processor further to execute the instructions to:
generate one or more new two-dimensional images based on the original two-dimensional image by transforming the original two-dimensional image; and
store the global unique identifier for the original two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field, for each of the one or more new two-dimensional images.

7. The system of claim 6, the at least one processor further to execute the instructions to store the original two-dimensional image and the one or more new two-dimensional images in a training data pack in the database.

8. The system of claim 6, wherein the one or more new two-dimensional images comprise a first set of two-dimensional images, the at least one processor further to execute the instructions to:
generate a second set of two-dimensional images based on the first set of two-dimensional images by transforming the first set of two-dimensional images; and
store the global unique identifier for the original two-dimensional image in metadata for each image in the second set of two-dimensional images.

9. A non-transitory computer-readable storage medium comprising instructions stored thereon that, when executed by a computing device cause the computing device to perform operations, the operations comprising:
tagging one or more three-dimensional assets with a global unique identifier, embedding each global unique identifier in a custom metadata field, and storing the one or more three-dimensional assets in a database;
creating a three-dimensional model based on the one or more three-dimensional assets and loading the three-dimensional model in a simulator;
generating a two-dimensional image that is a representation of the three-dimensional model in the simulator, the two-dimensional image comprising metadata that includes each global unique identifier for each three-dimensional asset of the three-dimensional model displayed in the two-dimensional image; and
assigning the two-dimensional image with a global unique identifier and storing global each unique identifier for each three-dimensional asset of the three-dimensional model displayed in the two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field for the two-dimensional image.

10. The non-transitory computer-readable storage medium of claim 9, wherein the two-dimensional image is an original two-dimensional image, the operations further comprising:
generating one or more new two-dimensional images based on the original two-dimensional image by transforming the original two-dimensional image; and
storing the global unique identifier for the original two-dimensional image in metadata comprising an exchangeable image file format (Exif) field that is a Javascript Object Notation (JSON) string that comprises an id field for the global unique identifier, a pass_number field, an initial_sim_time field, a sim_event field, a modified field, a source_immediate field, a source_ultimate field, a transform field, and a tool_parameters field, for each of the one or more new two-dimensional images.

11. The non-transitory computer-readable storage medium of claim 10, the operations further comprising storing the original two-dimensional image and the one or more new two-dimensional images in a training data pack in the database.

12. The non-transitory computer-readable storage medium of claim 10, wherein the one or more new two-dimensional images comprise a first set of two-dimensional images, the operations further comprising:
generating a second set of two-dimensional images based on the first set of two-dimensional images by transforming the first set of two-dimensional images; and storing the global unique identifier for the original two-dimensional image in metadata for each image in the second set of two-dimensional images.

\* \* \* \* \*